United States Patent
Lee

(10) Patent No.: US 8,360,381 B2
(45) Date of Patent: Jan. 29, 2013

(54) ROTARY ADJUSTING HOOK

(76) Inventor: Tsung-Ying Lee, Tainan (TW)

(*) Notice: Subject to any disclaimer, the term of this patent is extended or adjusted under 35 U.S.C. 154(b) by 0 days.

(21) Appl. No.: 12/903,217

(22) Filed: Oct. 13, 2010

(65) Prior Publication Data

US 2012/0049032 A1 Mar. 1, 2012

(30) Foreign Application Priority Data

Aug. 27, 2010 (TW) .............................. 99128880 A

(51) Int. Cl.
*B42F 13/00* (2006.01)

(52) U.S. Cl. .... 248/339; 248/323; 248/690; 211/106.01

(58) Field of Classification Search .................. 248/323, 248/339, 341, 309.1, 304, 690, 691, 317, 248/302, 303, 225.21, 231.91, 274.1, 276.1; 211/113, 115, 116, 118, 119, 106.01, 106, 211/34, 85.31, 87.01, 88.03, 189, 195, 181.1
See application file for complete search history.

(56) References Cited

U.S. PATENT DOCUMENTS

| 253,942 | A * | 2/1882 | Onderdonk | 248/308 |
| 4,788,969 | A * | 12/1988 | Thompson | 606/237 |
| 5,591,077 | A * | 1/1997 | Rowe | 452/189 |
| 6,250,595 | B1 * | 6/2001 | Campbell | 248/211 |
| 6,257,421 | B1 * | 7/2001 | Outten | 211/40 |
| 7,757,996 | B2 * | 7/2010 | Jacobs | 248/64 |
| 7,922,140 | B2 * | 4/2011 | Carver | 248/339 |
| 2005/0087662 | A1 * | 4/2005 | Jacobs | 248/339 |
| 2011/0011999 | A1 * | 1/2011 | Wischkin | 248/225.21 |
| 2012/0181403 | A1 * | 7/2012 | Lee | 248/225.21 |

* cited by examiner

Primary Examiner — Todd M Epps

(57) ABSTRACT

A rotary adjusting hook contains a hooking member including a circular first loop fitted on one end thereof, a first vertical segment extending downward from another end thereof, and a hook segment extending outward from the first vertical segment; a first retainer including a circular second loop fitted on one end thereof, a second vertical segment extending downward from another end thereof, a second retainer including a circular third loop fitted on one end thereof, and a third vertical segment extending downward from another end thereof; a positioning set including an axial connecting member and an adjusting member, and the axial connecting member including a first coupling segment to connect with an adjusting member; the adjusting member including a second coupling segment to connect with the first coupling segment of the axial connecting member.

9 Claims, 14 Drawing Sheets

US 8,360,381 B2

ROTARY ADJUSTING HOOK

BACKGROUND OF THE PRESENT INVENTION

1. Field of Invention

The present invention relates to a rotary adjusting hook that the distances between the hooking member and the first retainer and between the hooking member and the second retainer are adjusted to accommodate with different requirements.

2. Description of Related Arts

Referring to FIGS. 1 and 2, a conventional fixed hook 10 is integrally bend formed from a metal piece, and includes a horizontal plate 11, a first vertical plate 12 extending downward from a front end thereof, a second vertical plate 13 extending downward from a rear end thereof, a hooking portion extending from the first vertical plate 12, and an opening 15 defined between the first vertical plate 12 and the second vertical plate 13. In use, the opening 15 of the hook 10 is fitted on a wall 20 so that the first vertical plate 12 and the second vertical plate 13 retain with a front and a rear sides of the wall 20 so that the hooking portion 14 is used to hook a potted plant. However, a size of the opening 15 is fixed without being adjusted based on a size of the wall 20.

As illustrated in FIGS. 3 and 4, an adjustable hook 30 includes an integrally bend formed rod 31, and the rod 31 includes two vertical segments 311 and two first lateral segments 312, each first lateral segment 312 includes a first retaining piece 32 having an arcuate first groove 321 to receive the first lateral segment 312, and the first retaining piece 32 includes a through hole 322 to insert a bolt 33, the hook 30 also includes a hooker 34, and the hooker 34 includes a second vertical segment 341, a hook portion 342 extending from the second vertical segment 341, and a second lateral segment 343 with a second retaining piece 35, the second retaining piece 35 includes an arcuate second groove 351 to cover the second retaining piece 35 on the first lateral segment 312, and a bore 352 fixed thereon in response to the through hole 322 to insert the bolt 33 which is screwed with a nut 36 so that the first and the second retaining pieces 32, 35 are fixed on the first lateral segments 312, and between the first vertical segments 311 of the rod 31 and the second vertical segment 341 of the hooker 34 is defined an orifice 37. In operation, the nut 36 is rotated releasably so that the hooker 34 actuates the first and the second retaining pieces 32, 35 through the bolt 33 to displace on the first lateral segments 312, and a size of the orifice 37 is adjusted based on a width of a wall 20 so that the hook 30 is installed on the wall 20, and the second vertical segment 341 and the first vertical segments 311 retain with a front and a rear sides of the wall 20, thereafter, the nut 36 is rotated tightly to position the hook 30 on the wall 20, and the hook portion 342 is served to hang the potted plant. Nevertheless, such a conventional adjustable hook still has the following defects:

1. The size of the orifice 37 is limited by a length of the first lateral segments 312 without being adjusted on the basis of the requirement.

2. When the nut 36 is not rotated tightly, the first and the second retaining pieces 32, 35 and the hooker 34 displace forward easily, hence the hook 30 is not fixed on the wall 20 securely.

3. The hook 30 is sorted in a larger size, thus occupying store place.

4. The first lateral segments 312 and the hook portion 342 are easy to pierce a user, causing a danger.

The present invention has arisen to mitigate and/or obviate the afore-described disadvantages.

SUMMARY OF THE PRESENT INVENTION

The primary object of the present invention is to provide a rotary adjusting hook that the distances between the hooking member and the first retainer and between the hooking member and the second retainer are adjusted to accommodate with different requirements.

Further object of the present invention is to provide a rotary adjusting hook that as the hook is stored, the hooking member, the first retainers, and the second retainers are rotated so that the hooking member, the first, the second, and the third loops rotate to overlie together along the axial connecting member to lower a size of the hook.

Another object of the present invention is to provide a rotary adjusting hook of which an extension extends upward from the hook segment to prevent from piercing a user.

In accordance with the present invention, there is provided a rotary adjusting hook which contains a hooking member including a first lateral segment to be putted on a wall, a first loop fitted on one end of the first lateral segment, a first vertical segment extending downward from another end of the first lateral segment and used to engage with the wall, and a hook segment extending outward from the first vertical segment;

a first retainer including a second lateral segment to be putted on the wall, a second loop fitted on one end of the second lateral segment, and a second vertical segment extending downward from another end of the second lateral segment and used to engage with the wall, a second retainer including a third lateral segment to be putted on the wall, a third loop fitted on one end of the third lateral segment, and a third vertical segment extending downward from another end of the third lateral segment and used to engage with the wall;

a positioning set including an axial connecting member and an adjusting member, and the axial connecting member including a first coupling segment to insert through the first loop of the hooking member, the second loop of the first retainer, and the third loop of the second retainer, and the second loop of the first retainer and the third loop of the second retainer rotate along the axial connecting member to adjust a first distance between the second vertical segment of the first retainer and the first vertical segment of the hooking member and to adjust a second distance between the third lateral segment of the second retainer and the first vertical segment of the hooking member;

the adjusting member including a second coupling segment to connect with the first coupling segment of the axial connecting member.

DETAILED DESCRIPTION OF THE PREFERRED EMBODIMENT

Figure 1:
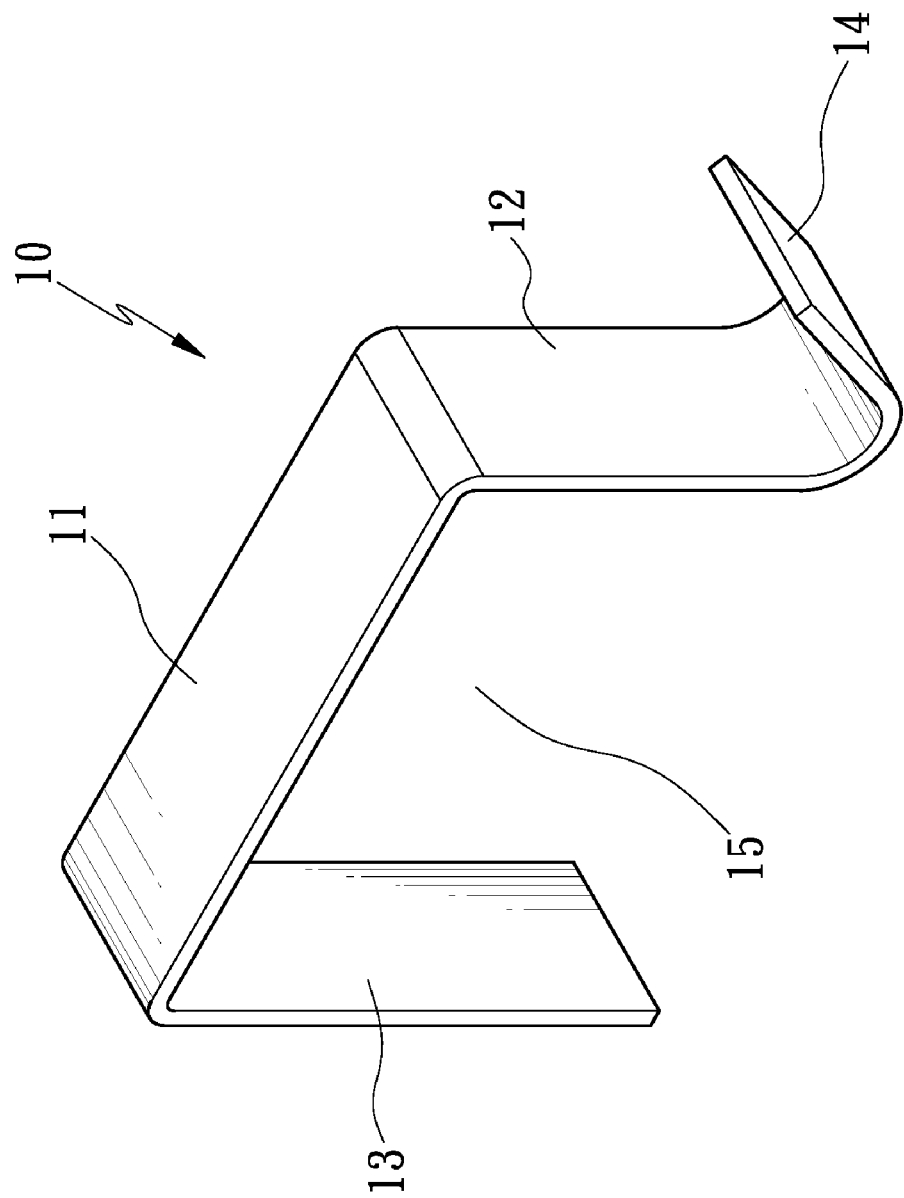
FIG. 1 is a perspective view of a conventional fixed hook.
Figure 2:
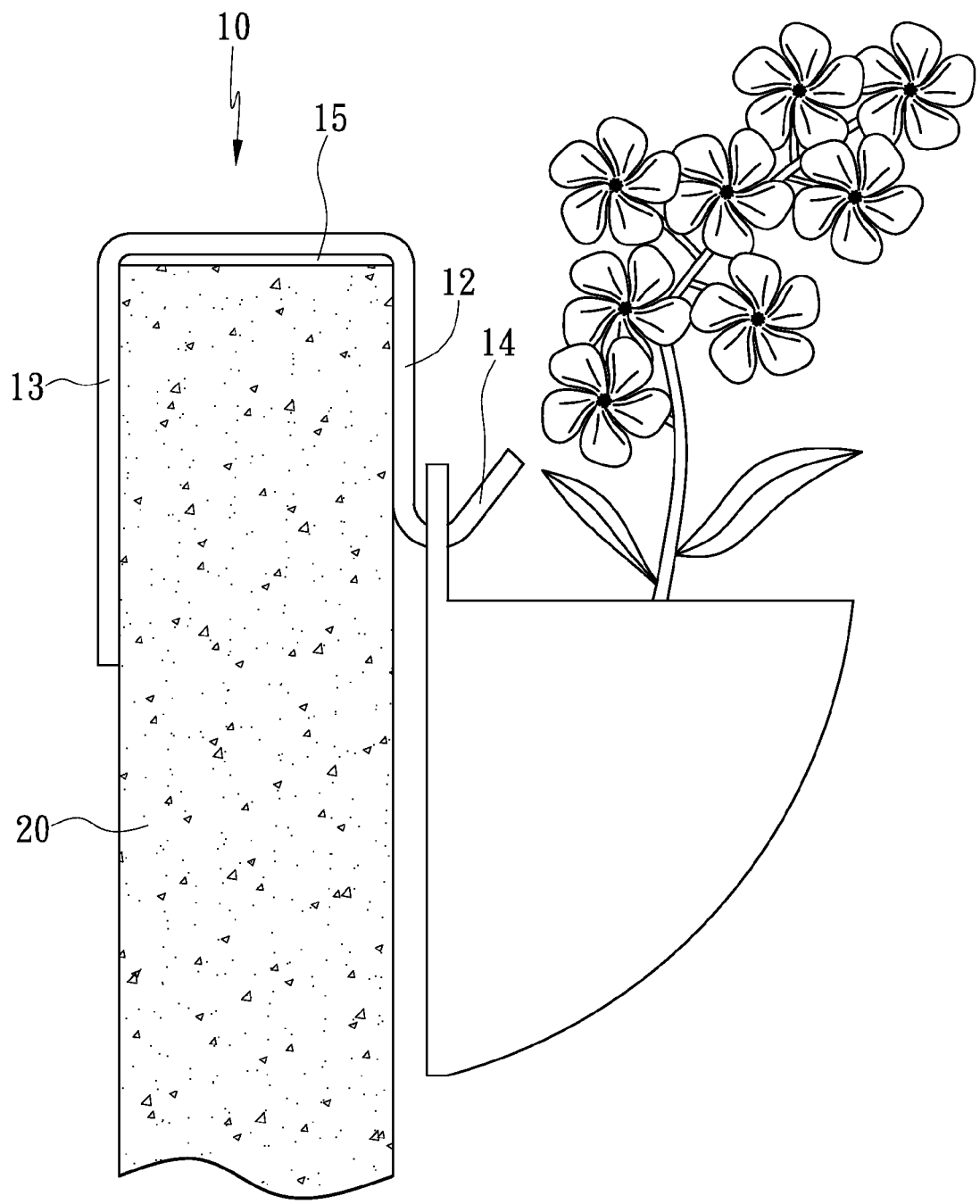
FIG. 2 is a plan view of the operation of the conventional hook.
Figure 3:
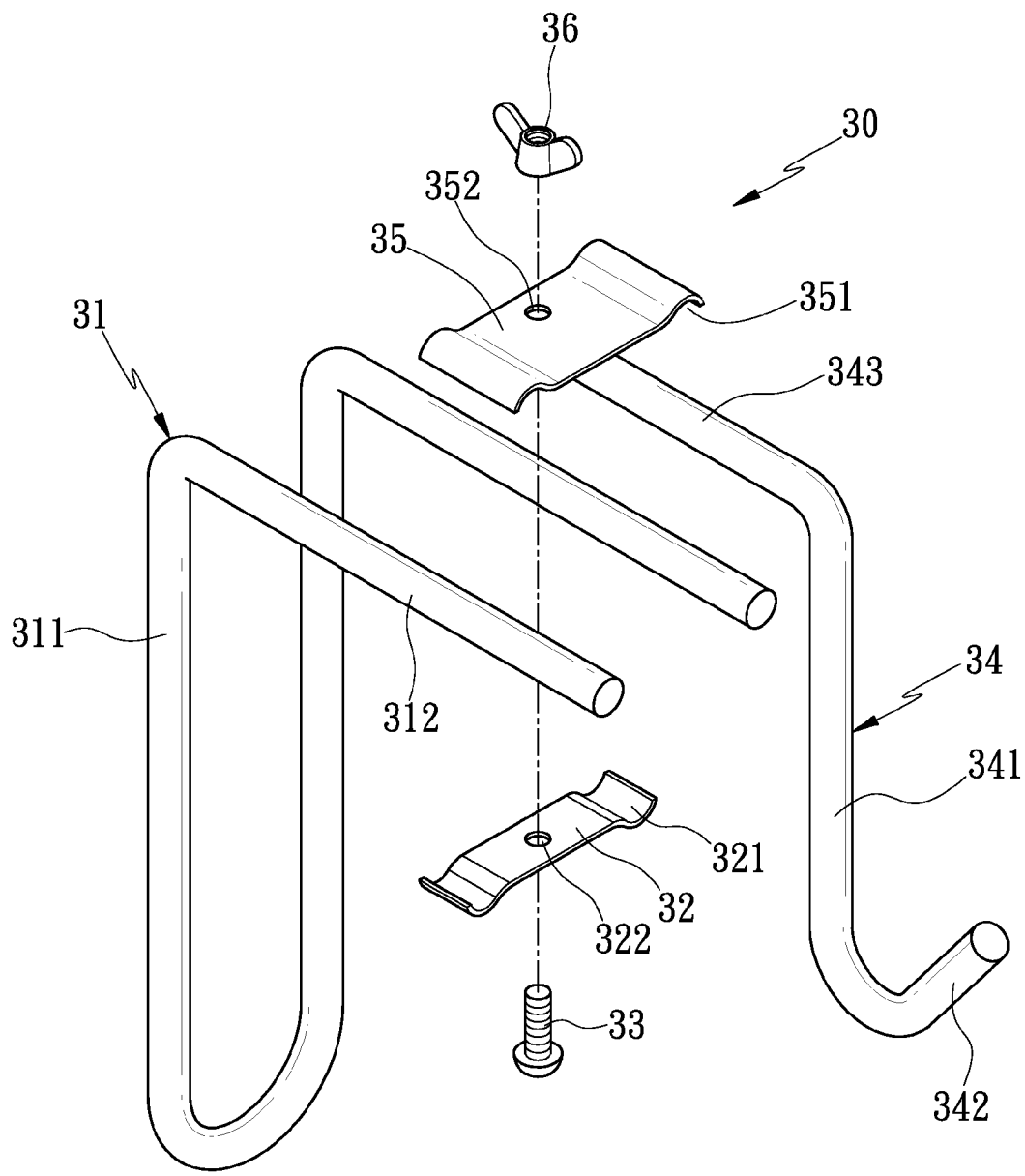
FIG. 3 is a perspective view of a conventional adjustable hook.
Figure 4:
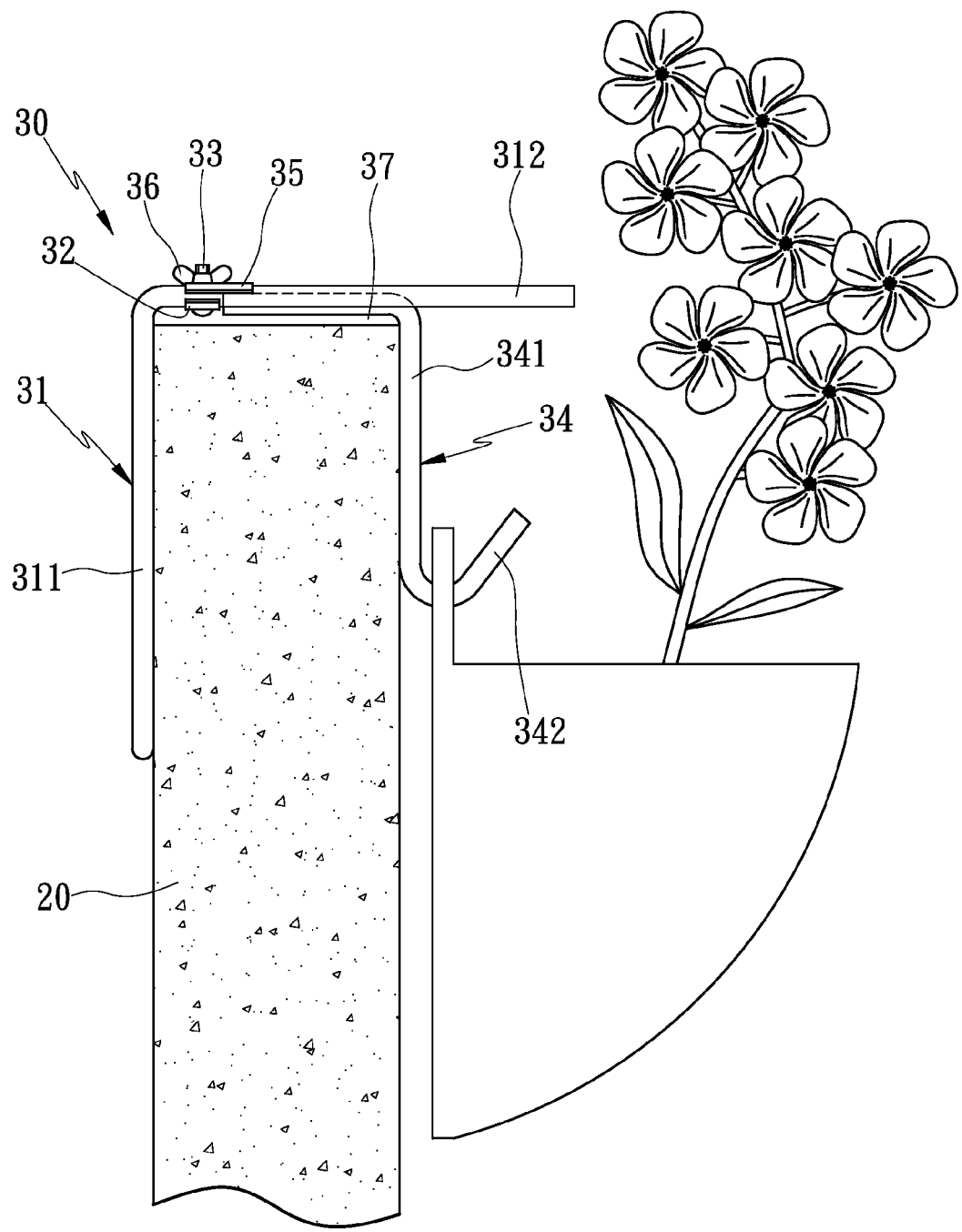
FIG. 4 is a plan view of the operation of the conventional adjustable hook.
Figure 5:
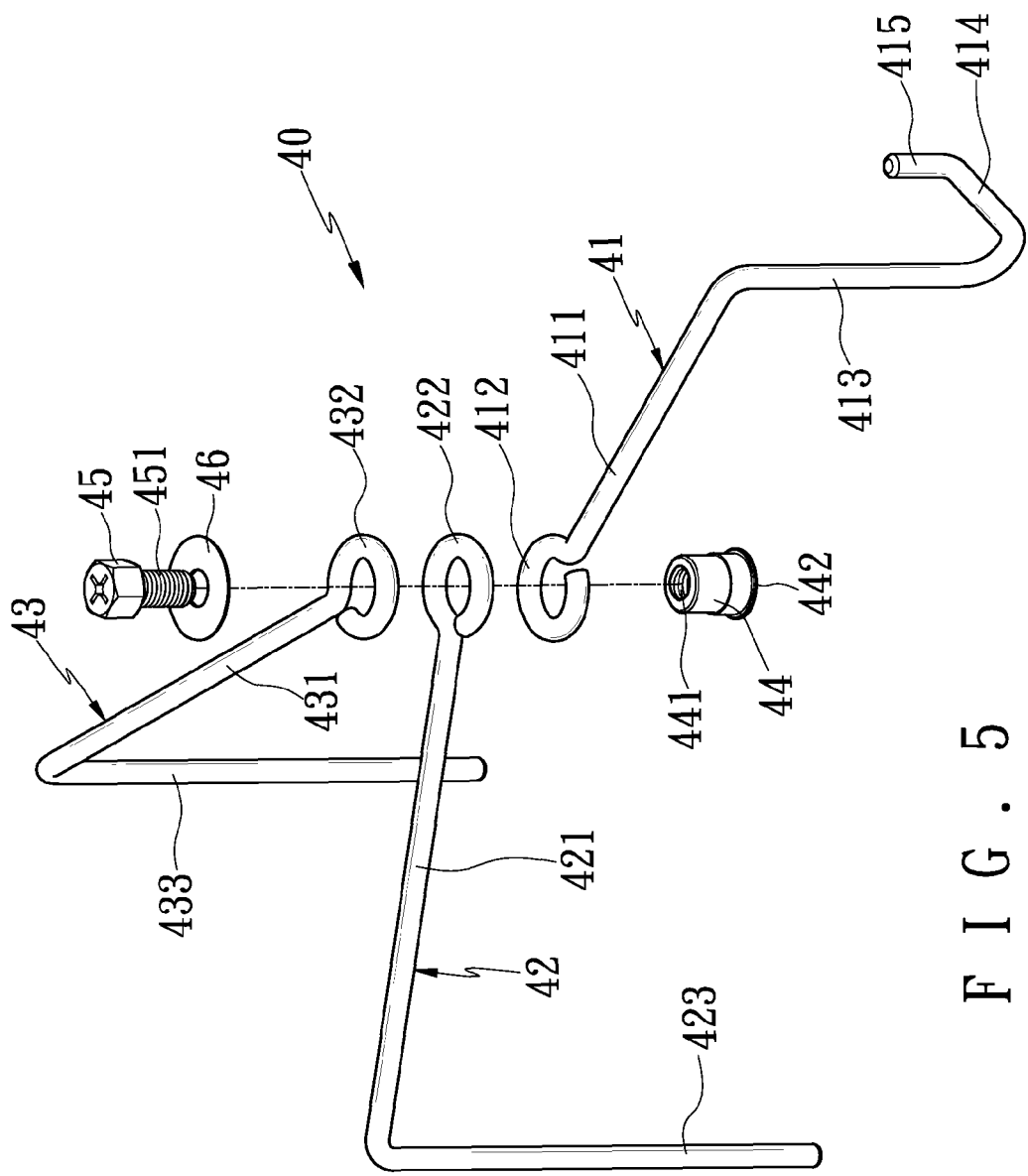
FIG. 5 is a perspective view showing the exploded components of a rotary adjusting hook according to a preferred embodiment of the present invention.
Figure 6:
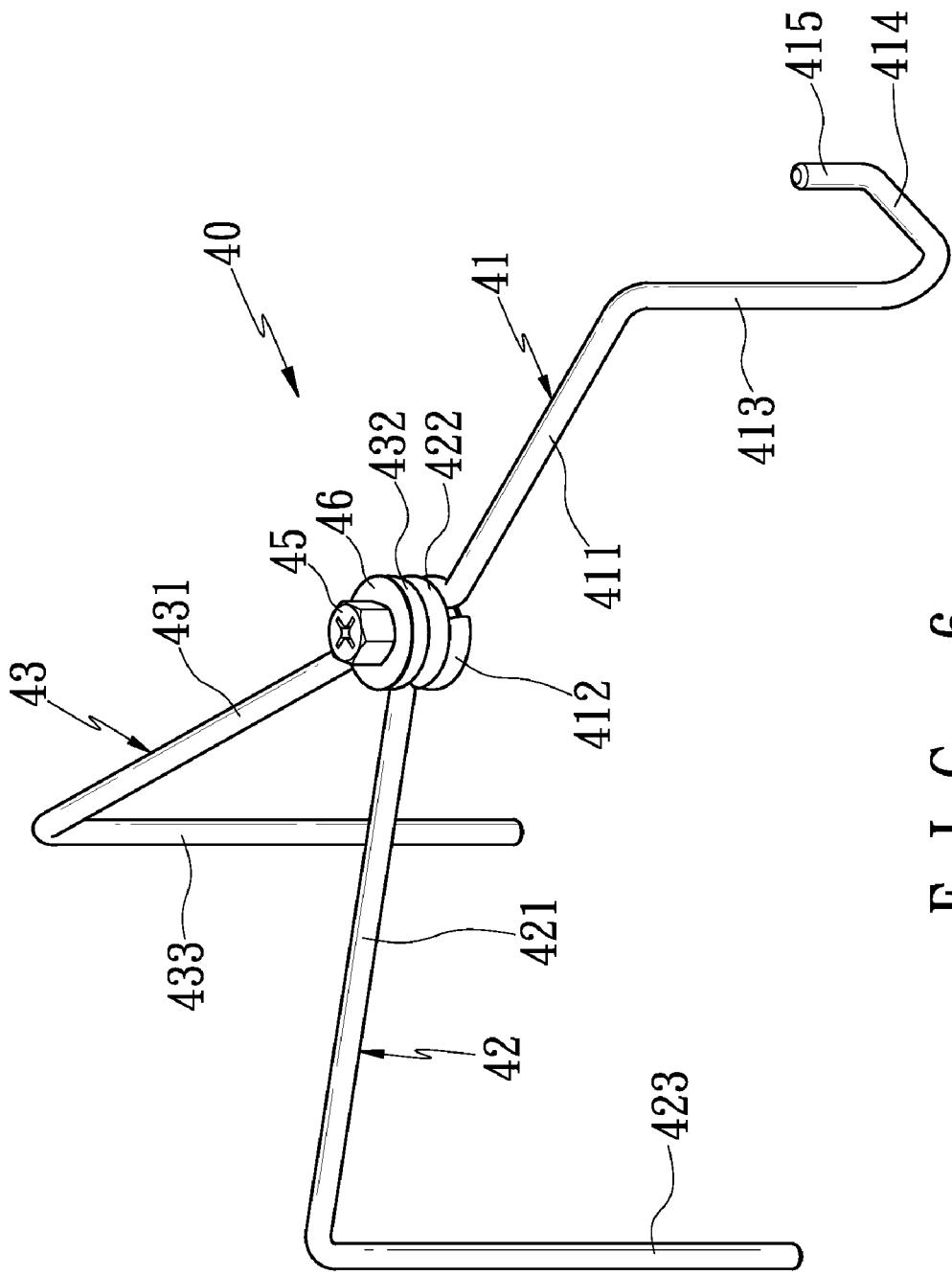
FIG. 6 is a perspective view showing the assembly of the rotary adjusting hook according to the preferred embodiment of the present invention.
Figure 7:
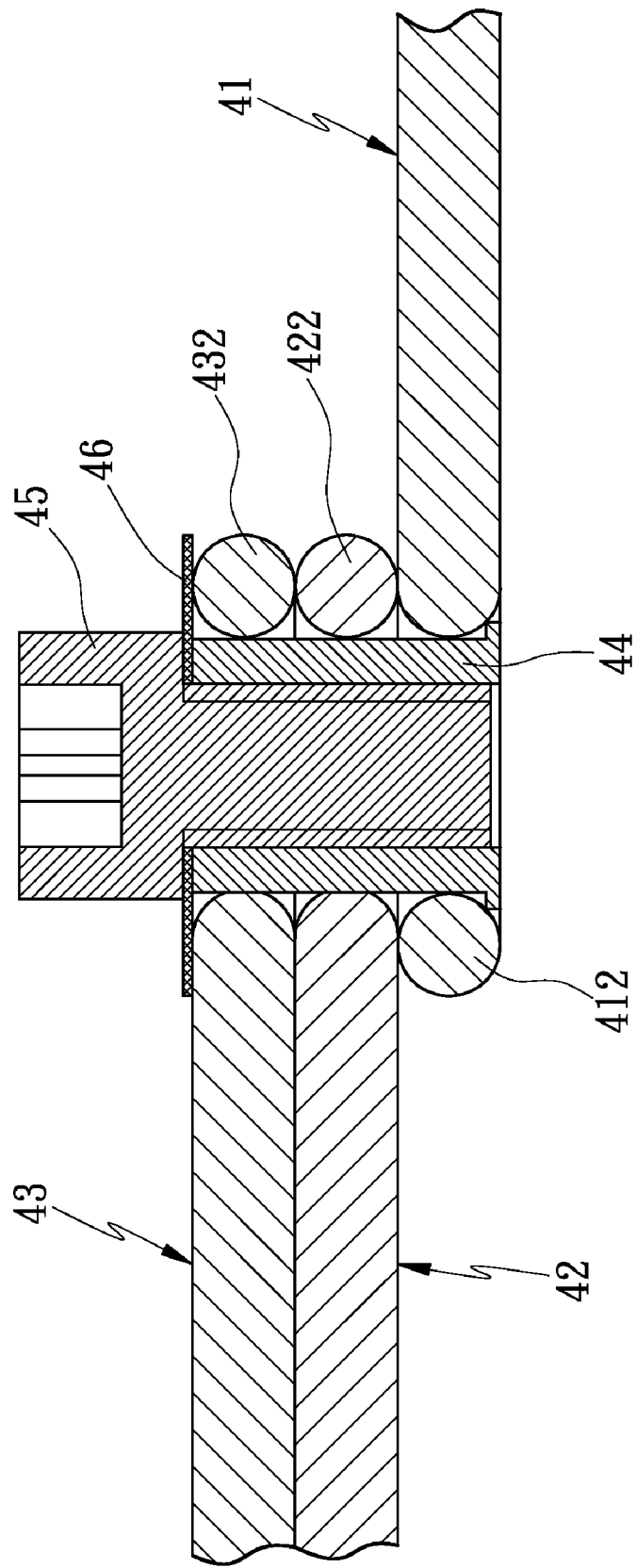
FIG. 7 is a cross sectional view showing a part of the assembly of the rotary adjusting hook according to the preferred embodiment of the present invention.

Referring to FIGS. 5-7, a rotary adjusting hook 40 in accordance with a preferred embodiment of the present invention comprises at least one hooking member 41, a plurality of retaining members, and a positioning set, wherein the hooking member 41 is integrally bend formed from a metal bar, and includes a first lateral segment 411 to be putted on a wall 50, a circular first loop 412 fitted on one end of the first lateral segment 411, a first vertical segment 413 extending downward from another end of the first lateral segment 411 and used to engage with the wall 50, a hook segment 414 extending outward from the first vertical segment 413, and an extension 415 extending upward from the hook segment 414 to prevent from piercing a user. The retaining member is formed in a L shape, and the adjusting hook 40 includes a first retainer 42 and a second retainer 43, wherein the first retainer 42 is integrally bend formed from a metal bar and includes a second lateral segment 421 to be putted on the wall 50, a circular second loop 422 fitted on one end of the second lateral segment 421, a second vertical segment 423 extending downward from another end of the second lateral segment 421 and used to engage with the wall 50, the second retainer 43 is integrally bend formed from a metal bar and includes a third lateral segment 431 to be putted on the wall 50, a circular third loop 432 fitted on one end of the third lateral segment 431, and a third vertical segment 433 extending downward from another end of the third lateral segment 431 and used to engage with the wall 50. The positioning set includes an axial connecting member 44 and an adjusting member 45, and the axial connecting member 44 is an axial shaft and includes a first coupling segment. In this embodiment, the axial connecting member 44 includes the first coupling segment, and the first coupling segment is a screw hole 441, the axial connecting member 44 also includes a stop plate 442 disposed on a bottom end thereof and extends out of the first loop 412 of the hooking member 41 and abuts against a bottom end of the first loop 412 by using the stop plate 442 so that the second and the third loops 422, 432 of the first and the second retainers 42, 43 are fitted onto the axial connecting member 44, and the first and the second retainers 42, 43 are axially connected with the axial connecting member 44 to rotate horizontally. The adjusting member 45 includes a second coupling segment. In this embodiment, the adjusting member 45 is a bolt and includes the second coupling segment, and the second coupling segment is a screw rod 451 to be screwed with the screw hole 441 of the axial connecting member 44. In this embodiment, the adjusting member 45 includes a washer 46 to enhance a contacting area of the adjusting member 45 and the second retainer 43 so that the adjusting member 45 and the axial connecting member 44 are retained with the hooking member 41, the first retainer 42, and the second retainer 43 to finish an assembly of the adjusting hook 40.

Figure 8:
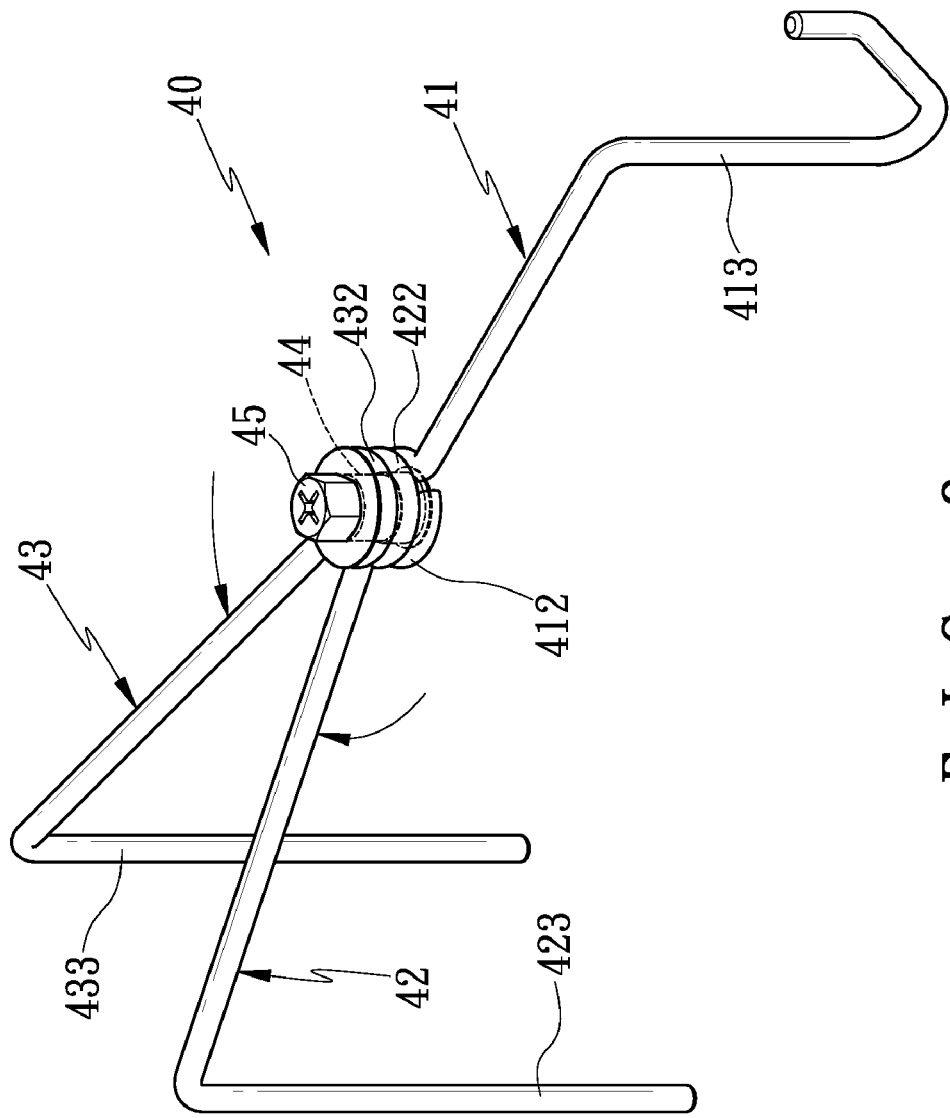
FIG. 8 is a perspective view showing the operation of the rotary adjusting hook according to the preferred embodiment of the present invention.
Figure 9:
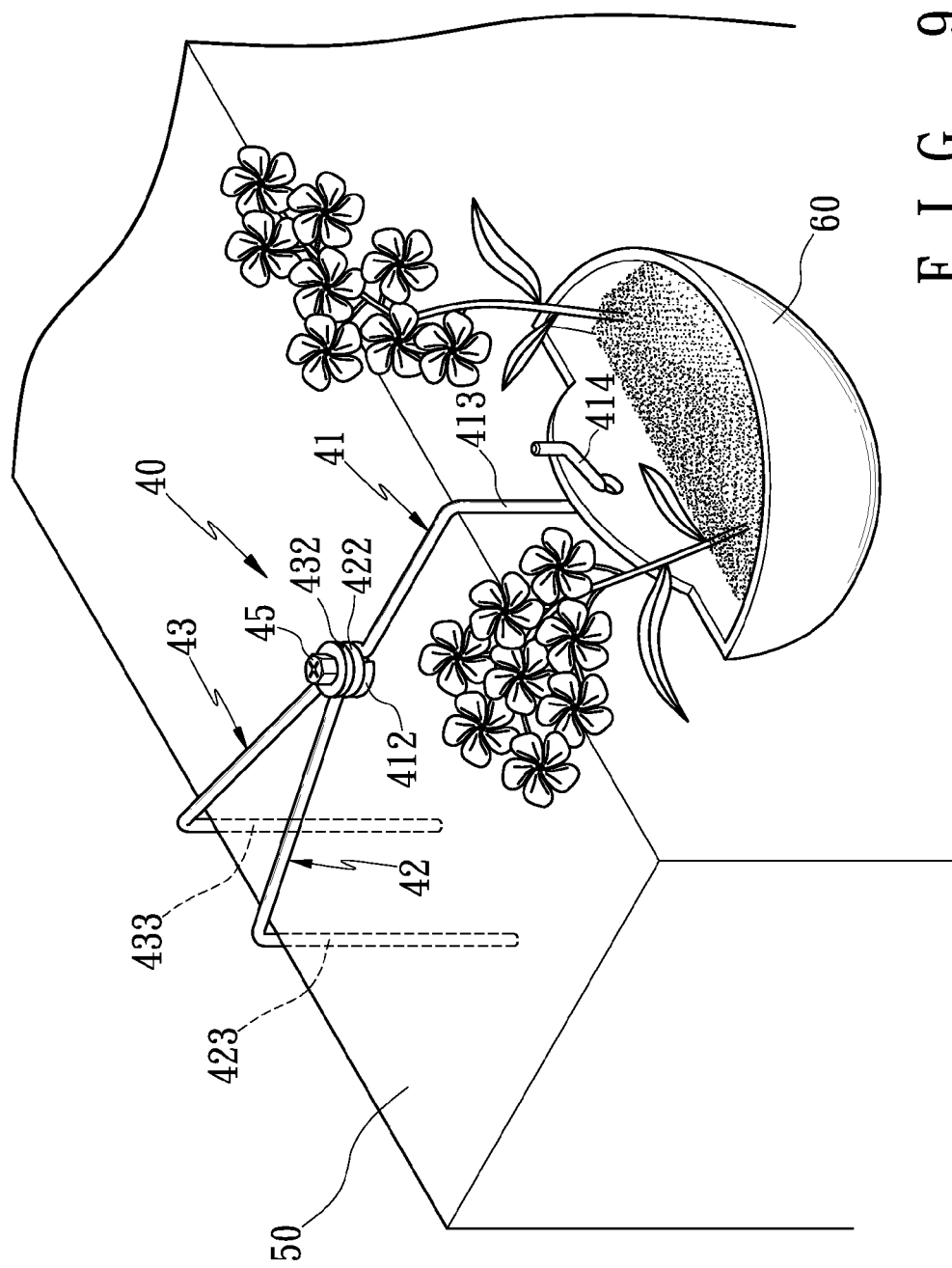
FIG. 9 is another perspective view showing the operation of the rotary adjusting hook according to the preferred embodiment of the present invention.
Figure 10:
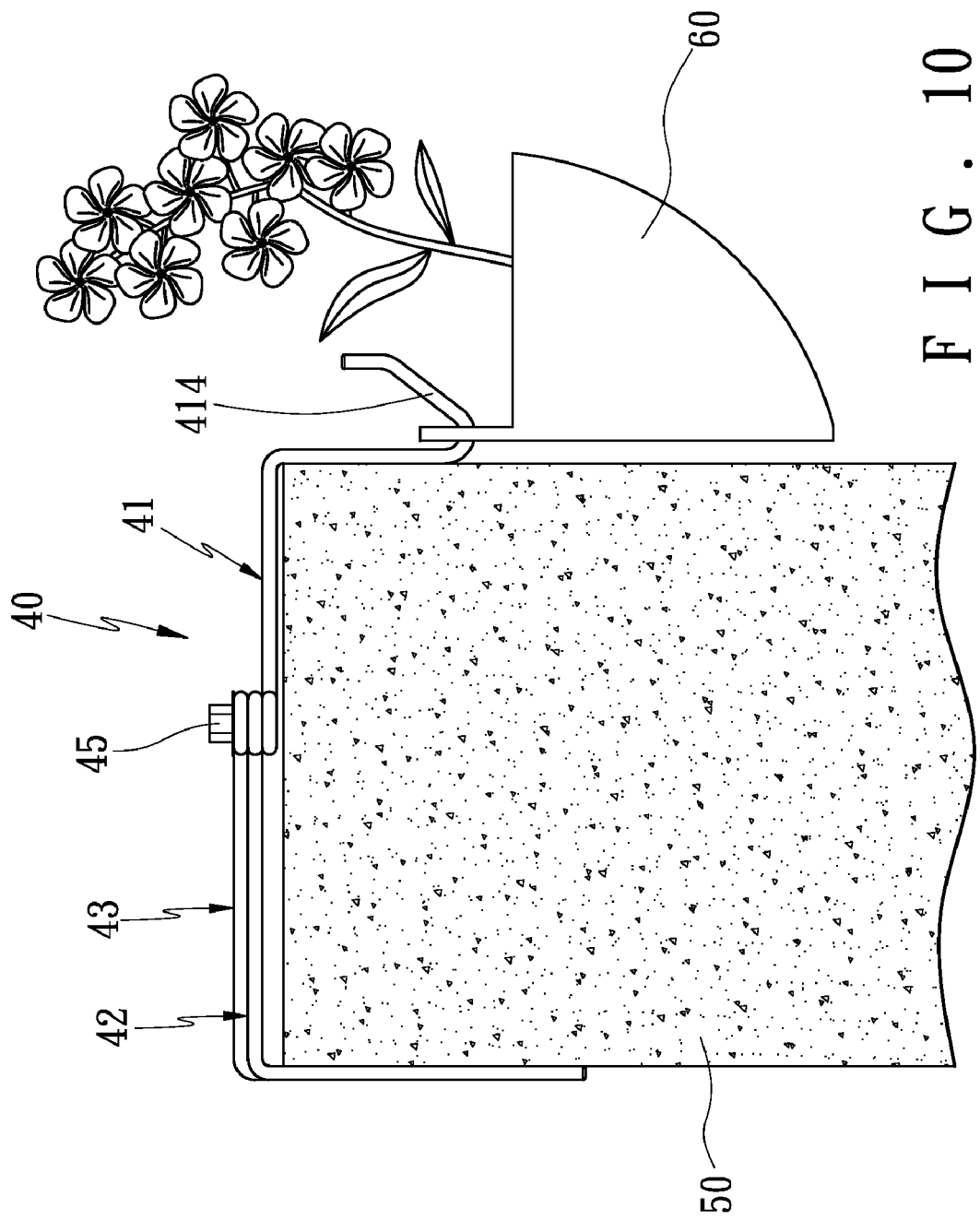
FIG. 10 is a cross sectional of FIG. 9.

As shown in FIGS. 8-10, when the hook 40 is applied in a wall 50 with a large width, a distance between the hooking member 41, the first and the second retainers 42, 42 is adjusted based on a width of the wall 50. For example, the adjusting member 45 is rotated releasably, and the first and the second retainers 42, 43 are rotated so as to rotate backward along the axial connecting member 44, such that two distances between the second vertical segment 423 and the first vertical segment 413 and between the third vertical segment 433 and the first vertical segment 413 are expanded so that the hook 40 are fixed on the wall 50. Thereafter, the first, the second, and the third vertical segments 413, 423, 433 engage with a front and a rear ends of the wall 50 to form three engaging positions so that the hooking member 41, the first and the second retainers 42, 43 keep balance to retain with the wall 50, and then the adjusting member 45 is rotated tightly so that the adjusting member 45 and the axial connecting member 44 retain the first, the second, the third loops 412, 422, 432 to position the hooking member 41, the first and the second retainers 42, 43 and to prevent the hooking member 41 from forward lateral displacement, hence the hook 40 is retained on the wall 50 securely, and the hook segment 414 is used to hang a potted plant 60.

Figure 11:
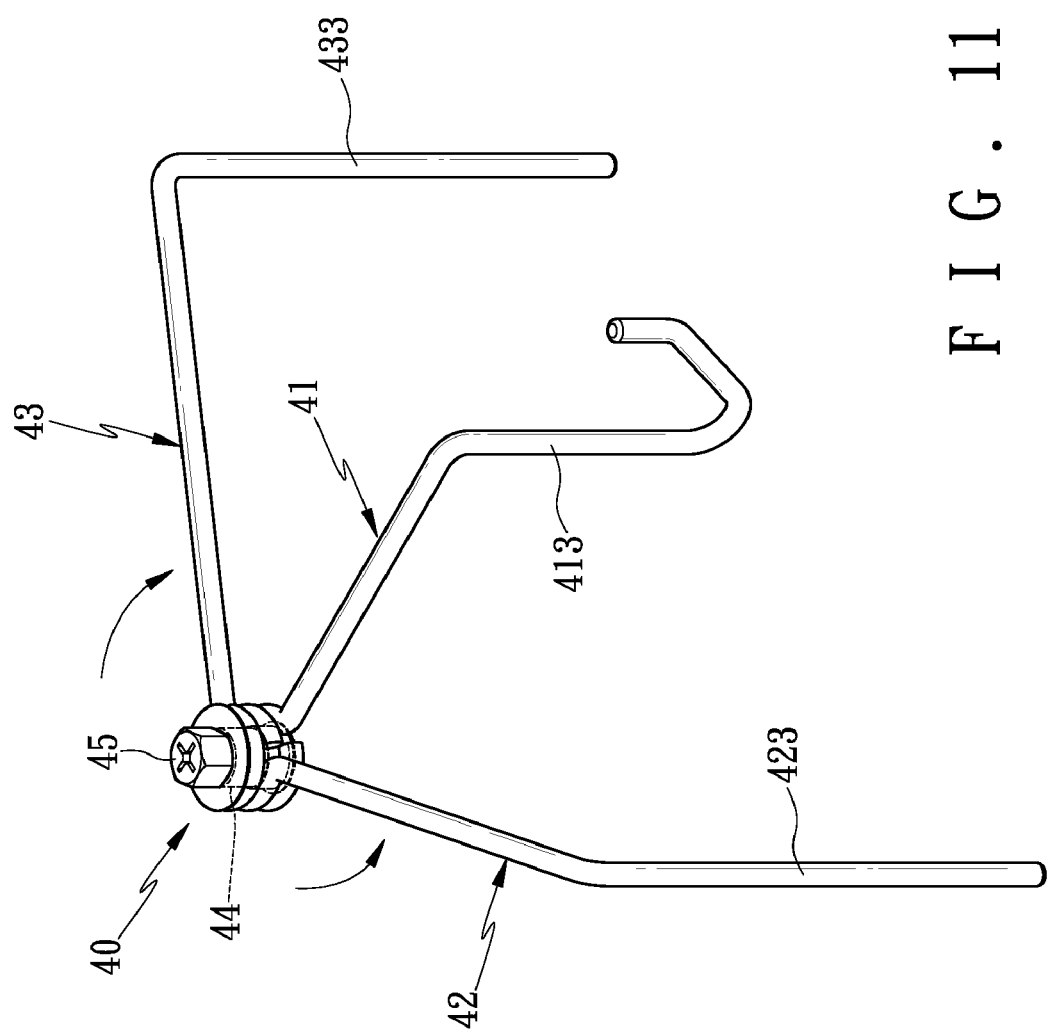
FIG. 11 is another perspective view showing the operation of the rotary adjusting hook according to the preferred embodiment of the present invention.
Figure 12:
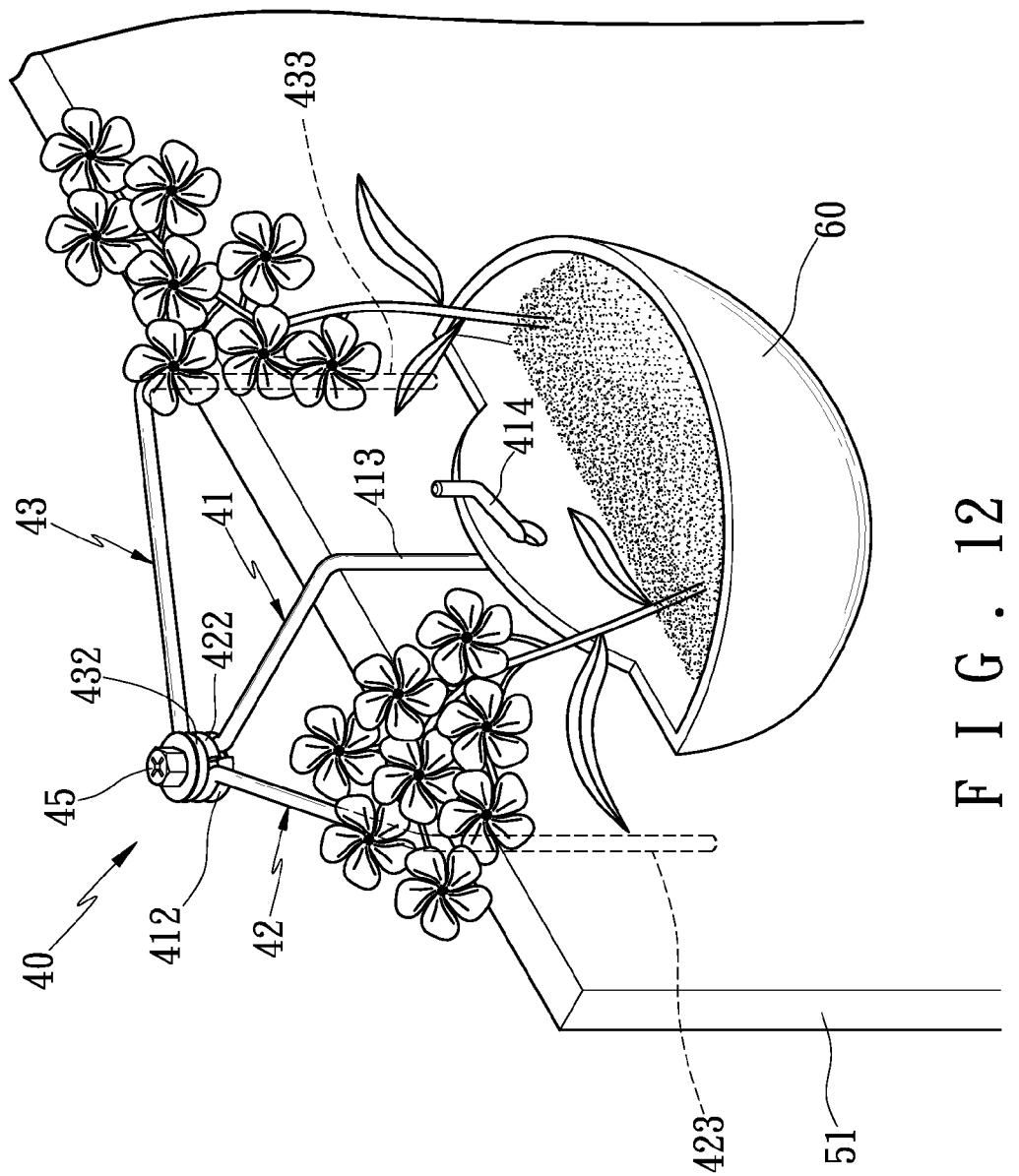
FIG. 12 is also another perspective view showing the operation of the rotary adjusting hook according to the preferred embodiment of the present invention.
Figure 13:
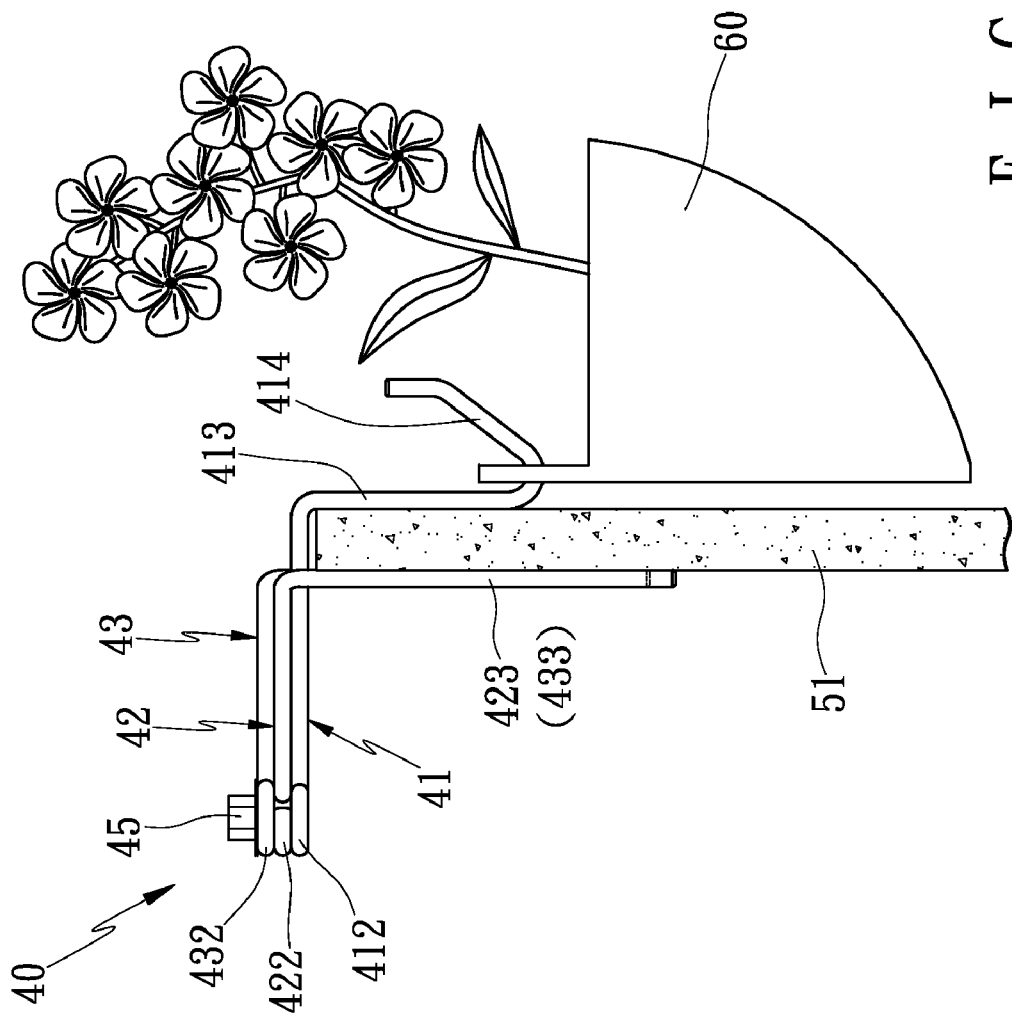
FIG. 13 is a cross sectional of FIG. 12.

Referring to FIGS. 11-13, when the hook 40 is applied in a wall 51 with a small width, the adjusting member 45 is rotated releasably, and the first and the second retainers 42, 43 are rotated so as to rotate forward along the axial connecting member 44, such that two distances between the second vertical segment 423 and the first vertical segment 413 and between the third vertical segment 433 and the first vertical segment 413 are decreased so that the hook 40 are fixed on the wall 51. Thereafter, the first, the second, and the third vertical segments 413, 423, 433 engage with a front and a rear ends of the wall 51 to form three engaging positions so that the hooking member 41, the first and the second retainers 42, 43 keep balance to retain with the wall 51, and then the adjusting member 45 is rotated tightly so that the adjusting member 45 and the axial connecting member 44 retain the first, the second, the third loops 412, 422, 432 to position the hooking member 41, the first and the second retainers 42, 43 and to prevent the hooking member 41 from forward lateral displacement, hence the hook 40 is retained on the wall 51 securely, and the hook segment 414 is used to hang the potted plant 60.

Thereby, the distances between the hooking member 41 and the first retainer 42 and between the hooking member 41 and the second retainer 43 are adjusted to accommodate with different requirements.

Figure 14:
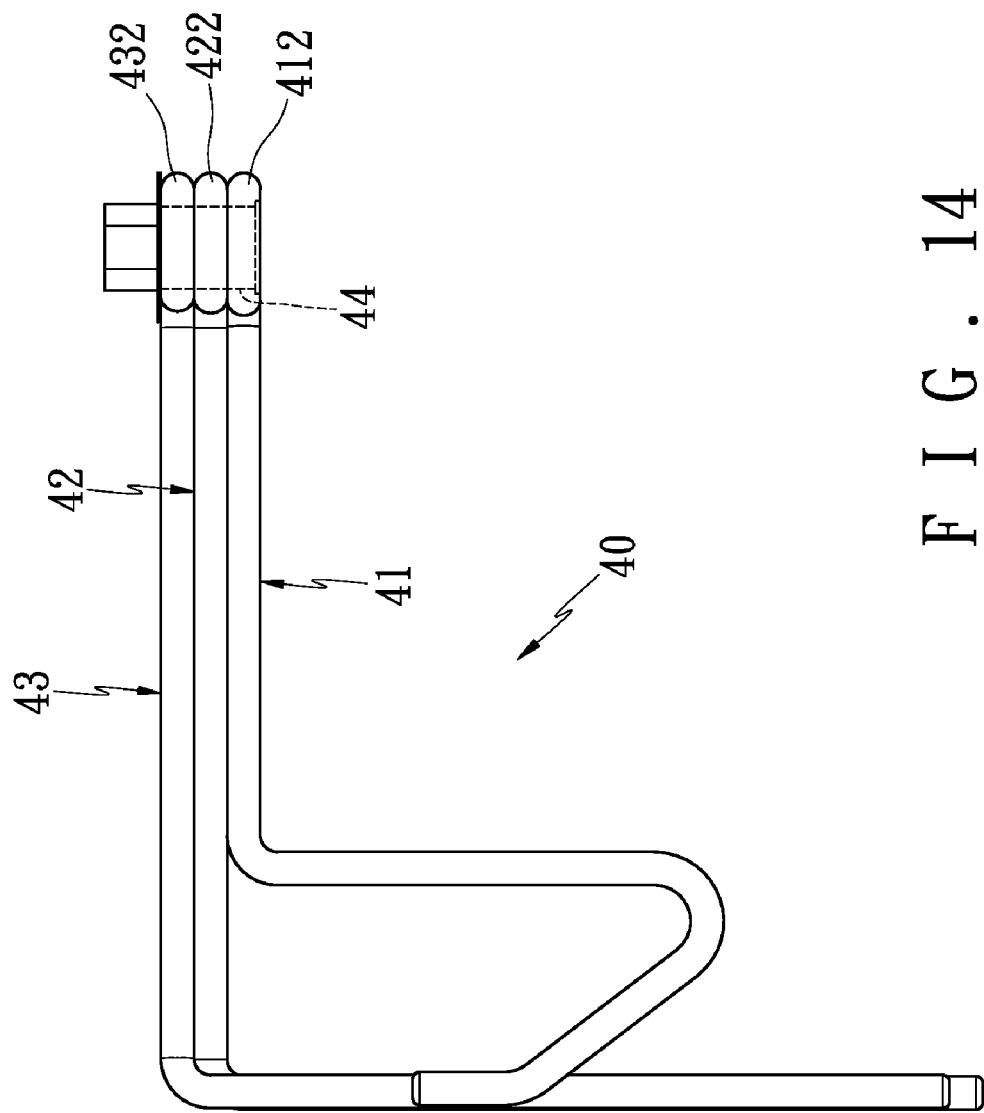
FIG. 14 is a plan view showing the operation of the rotary adjusting hook according to the preferred embodiment of the present invention.

As illustrated in FIG. 14, as the hook 40 is stored, the hooking member 41, the first retainers 42, and the second retainers 43 are rotated so that the hooking member 41, the first, the second, and the third loops 412, 422, 432 rotate to overlie together along the axial connecting member 44 to lower a size of the hook 40.

The invention is not limited to the above embodiment but various modifications thereof may be made. It will be understood by those skilled in the art that various changes in form and detail may made without departing from the scope and spirit of the present invention.

What is claimed is:

1. A rotary adjusting hook comprising:

a hooking member including a first lateral segment used to place the hook member on a wall, a first loop formed on one end of the first lateral segment, a first vertical segment extending downward from another end of the first lateral segment and used to engage with a wall surface of the wall, and a hook segment extending outward from the first vertical segment;

a first retainer including a second lateral segment used to place the first retainer on the wall, a second loop formed on one end of the second lateral segment, and a second vertical segment extending downward from another end of the second lateral segment and used to engage with the wall surface, a second retainer including a third lateral segment used to place the second retainer on the wall, a third loop formed on one end of the third lateral segment, and a third vertical segment extending downward from another end of the third lateral segment and used to engage with the wall surface;

a positioning set including an axial connecting member and an adjusting member, and the axial connecting member including a first coupling segment to insert through the first loop of the hooking member, the second loop of the first retainer, and the third loop of the second retainer, and the second loop of the first retainer and the third loop of the second retainer rotate along the axial connecting member to adjust a first distance between the second vertical segment of the first retainer and the first vertical segment of the hooking member and to adjust a second distance between the third lateral segment of the second retainer and the first vertical segment of the hooking member;

the adjusting member including a second coupling segment to connect with the first coupling segment of the axial connecting member;

such that the adjusting member and the axial connecting member are capable of fixing the hooking member, and the first retainer and the second retainer;

wherein an axis of a connection of the first loop, the second loop, and the third loop is parallel to the first vertical segment of the hooking member, the second vertical segment of the first retainer, and the third vertical segment of the second retainer.

2. The rotary adjusting hook as claimed in claim 1, wherein the hooking member is integrally bend formed from a metal bar.

3. The rotary adjusting hook as claimed in claim 1, wherein the first loop of the hooking member is circular.

4. The rotary adjusting hook as claimed in claim 3, wherein the hooking member also includes an extension extending upward from the hook segment.

5. The rotary adjusting hook as claimed in claim 1, wherein the first and the second retainers are formed in a L shape and integrally bend formed from a metal bar.

6. The rotary adjusting hook as claimed in claim 1, wherein the second loop of the first retainer is circular, and the third loop of the second retainer is circular.

7. The rotary adjusting hook as claimed in claim 1, wherein the axial connecting member of the positioning set is an axial shaft and includes a first coupling segment, and the first coupling segment is a screw hole, the axial connecting member also includes a stop plate disposed on a bottom end thereof.

8. The rotary adjusting hook as claimed in claim 7, wherein the adjusting member of the positioning set is a bolt and includes a second coupling segment, and the second coupling segment is a screw rod to be screwed with the screw hole of the axial connecting member.

9. The rotary adjusting hook as claimed in claim 1, wherein the adjusting member includes a washer to enhance a contacting area of the adjusting member and the second retainer.

* * * * *